3,046,161
RECOVERY OF AMYLOSE FROM HIGH AMYLOSE CORNSTARCH

Edna M. Montgomery and Kenneth R. Sexson, Peoria, Ill., assignors to the United States of America as represented by the Secretary of Agriculture
No Drawing. Filed Apr. 21, 1960, Ser. No. 23,861
7 Claims. (Cl. 127—71)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to an inexpensive and effective method for obtaining substantially amylopectin-free amylose in nearly quantitative yields from "high amylose" cornstarch.

Films prepared from pure amylose or substantially amylopectin-free amylose are known to have certain desirable properties, and chemical research to modify amylose so as to enhance these properties, or to build in others, continues. However, the cost of obtaining amylose which is free or substantially free of associated amylopectin restricts the potential market for amylose films.

Within the last several years corn breeders have succeeded in producing certain strains of corn which yield starch known as "high amylose" cornstarch because this starch contains from 40 to 80 percent of linear structure as shown by comparison of iodine affinity with that of pure amylose, Bates et al., J. Am. Chem. Soc. 65, 142 (1943); Wilson et al., J. Am. Chem. Soc. 65, 1380 (1943). It is assumed that pure amylose binds or absorbs 200 mg. $I_2$/g. However, after complete dispersion of the "high amylose" cornstarches, in alkali, about 80 percent of the iodine affinity of the starch can be accounted for in the amylose precipitated from neutral solution as the n-butanol complex; the remaining 20 percent is accounted for by amylopectin (cf. Example 6, amylopectin fraction). On the other hand, ordinary (dent) cornstarch contains only 27 percent of linear starch. The "high amylose" starches are becoming available commercially as commercial plantings of "high amylose" corn are extended.

Although the solution properties of dent cornstarch permit swelling, gelatinization, and pasting of the starch in water over a temperature range of 50° to 90° C., high amylose cornstarch has little or no swelling power in hot water unless autoclaved at about 160° C. Its gelatinization range is greater, and the starch does not paste in freely boiling water. We have found that only from 5 to 10 percent of the amylose present in the starch can be obtained from "high amylose" cornstarch with boiling water or even with boiling water containing sulfate, as taught for ordinary starches by Bus, U.S. 2,829,990. This restricts one of the primary advantages for which "high amylose" corn was bred.

Although it is known that amylose is precipitated in good yields from freely boiled aqueous solutions of ordinary cornstarch by complexing it with n-butanol, very little amylose-butanol complex is formed with conventionally boiled "high amylose" cornstarch unless the latter is first dispersed by alkali or by autoclaving at high temperatures. However, a freezing and thawing pretreatment of "high amylose" cornstarch according to our invention permits a quantitative butanol complexing of the amylose from extracts of the starch made in boiling water.

In the present invention we have discovered an inexpensive pretreatment which permits obtaining almost quantitative recoveries of nearly pure amylose from "high amylose" cornstarch by successively extracting in boiling water "high amylose" cornstarch which has been hard-frozen and thawed one or more times, each time centrifuging to separate the swollen granules, comprising mainly amylopectin, from the supernatant which then contains essentially amylose, and retrogradatively precipitating the amylose therefrom by chilling at 0 to 2° C. for from 1 to 10 hours, depending on the concentration of amylose.

More specifically, our invention involves the discovery that one or two hard freezing and thawing pretreatment cycles applied to a 65 percent aqueous slurry of "high amylose" starch apparently weakens or ruptures the intragranular amylose-amylopectin bonds so that immediately upon stirring the thusly pretreated starch in boiling water, the starch granules gelatinize and swell many times in size. Although the starch does not paste, amylose is extracted in roughly quantitative yields in boiling water, and the starch residual (amylopectin, retaining the granular outline), is separated as a compact cake by sedimentation leaving the amylose in the centrifuged supernatant.

We have also found that if the hard freezing pretreatment of the starch granules is conducted in an aqueous medium containing freezing point depressant additives such as 2 percent sodium salicylate or 25 percent ethanol (by weight), the amylose is leached more rapidly from the gelatinized granules and the amylose isolated is of even a higher purity. Two freezing pretreatments also result in greater purity of the amylose than one freezing pretreatment.

Although for convenience we have chosen certain bath temperatures and freezing times, namely 6 hours for a bath temperature of −10° C., 3 hours for −33.4° C., and 1 minute for −78° C. (Dry Ice-acetone), it is probable that these times are not critical and are subject to some variation.

Indicative of its superior qualities, our wet amylose is readily soluble in 1 N sodium hydroxide and the air-dried and then partially pulverized amylose obtained is soluble therein to the extent of 20 percent at 25° C.

Our pretreatment provides similar results on "high amylose" cornstarch isolated by wet milling procedure after steeping in water at +37° C. or in aqueous $SO_2$ liquors at 50–60° C. The starch may be used in undried form or after drying at 49° C.

For the practical employment of our invention, it is necessary to point out that from 75 to 80 percent of the total amylose (88 to 99 percent purity) is isolated from a first freely boiling water extraction of a 2 percent "high amylose" starch dispersion (70–75 percent if the starch dispersion concentration is 4 percent). About 15 to 25 percent (85–95 percent purity) of the total amylose appears in a second extraction, and 5 to 10 percent (80–85 percent purity) in a third extraction.

The following embodiments further illustrate our invention.

Example 1

(Separation of amylose from amylopectin of "high amylose" $SO_2$-steeped cornstarch; iodine affinity 114 mg. $I_2$/g.; amylose content as determined by butanol precipitation of alkali dispersed starch 46 percent; one prefreezing operation.)

Twenty g. (dry basis) of 60 mesh "high amylose" cornstarch (8.4 percent moisture) was slurried in 40 ml. water at 25° C. and frozen in a Dry Ice-acetone bath at −78° C. for 1 minute to a hard cake, thawed in 100 ml. water at 25° C., filtered, reslurried in 20 ml. distilled water, and added to 500 ml. of briskly boiling water contained in a Pyrex 3-necked boiling flask equipped with a sealed stirrer, condenser, and thermometer. The pH of the dispersion was controlled at 6.2 to 6.5 with phosphate buffer. Temperature of the water dropped to 95 to 96° C. on addition of the slurry but returned to 100° C. within 3 minutes. Heat was supplied by an electrically heated mantle. The starch gelatinized in the water instantly, swelling to from about 6–9 times its original size. Extraction was carried out for 120 minutes with vigorous stirring at 100° C. in freely boiling water. Sedimentation of the hot starch-water dispersion was made at 2,000 $\times g$ for 20 minutes resulting in a separation of the starch residual (amylopectin) as a compact cake with a volume equal to about 20 percent of the total.

The supernatant, volume 400 ml., contained amylose (concentration of crude amylose, 1.76 percent; amylose precipitable by n-butanol, 1.63 percent). At 25° C. amylose in supernatant solutions was stable toward retrogradation, as shown by no increase in turbidity, for several hours. At 0 to 2° C. amylose precipitated from the supernatant as an amorphous solid during 3 hours. Separated by sedimentation at 2,000×g and spread on a glass surface at 25° C., the amylose dried overnight to a clear, compact, hard solid, containing about 9 percent moisture. It was soluble in 1 N sodium hydroxide in 20 percent concentration at 25° C. The percent yield of amylose was calculated on a basis of the amylose of iodine affinity of 200 mg. $I_2/g.$ present in the isolated solid amylose, i.e., the weight of amylose isolable multiplied by the purity factor after analysis was divided by the weight of amylose present in starch (and corresponding to 80 percent of the total iodine affinity of the starch). Amylose was isolated in a total yield on a basis of iodine affinity corresponding to 93 percent of the total amylose content as follows: amylose separated at 0 to 2° C. from a 200 ml. aliquot of the supernatant from the first extraction was freeze dried, defatted, freed of solvents, and found to weigh 3.58 g. (purity by iodine affinity 90 percent), the total supernatant volume thus accounting for 8.64 g., or 70 percent of the 9.2 g. of 200 mg. $I_2/g.$ amylose estimated to be present in the starch. Amylose isolated from a total second extraction of the starch residual by the same procedure weighed 1.9 g. with a purity of 90 percent (18.6 percent of the estimated total amylose) and from a third extraction of the starch in a yield of 0.6 g. of 81 percent purity (5.2 percent of total). Fractionation of the starch residual in neutral aqueous solution after dispersion in de-aerated 1 N sodium hydroxide at 25° C. yielded 8.3 g. of amylose-free amylopectin and 0.36 g. of amylose precipitable by n-butanol.

*Example 2*

(Separation of amylose from amylopectin of a sample of the high amylose cornstarch used in Example 1 after one prefreezing operation in water at —33.4° C. during 3 hours.)

Ten g. of the pretreated starch was fractionated according to the procedure of Example 1, using a 2 percent starch concentration during the extraction operation. Amylose, accounting by iodine affinity for 97 percent of the amylose estimated to be present (4 g. 200 mg. $I_2/g.$) in the starch was isolated as follows: from total first extract 3.54 g. amylose of 95 percent purity (77 percent); from total second extract 0.80 g. amylose of 90 percent purity (16.6 percent); from total third extract 0.25 g. amylose of 80 percent purity (5 percent).

Starch residual yielded amylose-free amylopectin equal to 4.2 g.; amylose precipitable by n-butanol, 0.1 g.

*Example 3*

(Separation of amylose from amylopectin of a sample of the "high amylose" cornstarch used in Example 1 after one prefreezing operation at —10° C. during 6 hours.)

Twenty (20.0) g. of the treated cornstarch was fractionated according to the procedure of Example 1, using a 4 percent starch concentration during extraction of the amylose for 120 minute periods. Amylose accounting for 95 percent of the amylose estimated to be present (9.2 g. 200 mg. $I_2/g.$) was isolated as follows: from total first extract 7.1 g. amylose of 92 percent purity (71 percent); from total second extract 1.83 g. amylose of 90 percent purity (16 percent); and from the total third extract 0.72 g. amylose of 83 percent purity (8 percent).

Starch residual yielded 8.3 g. of amylose-free amylopectin (equal to 42 percent of the starch) and amylose precipitable by n-butanol in a yield of 0.26 g. (1.3 percent of the starch).

*Example 4*

(Separation of amylose from amylpectin of "high amylose" cornstarch ($SO_2$ steeped, iodine affinity of 136 mg. $I_2/g.$, amylose content of 54 percent determined by n-butanol complexing; protein 065 percent) after the wet milled but undried starch was frozen at —78° C., thawed, and refrozen at —78° C.)

Fractionation of 20.0 g. of the treated cornstarch was carried out as in Example 1, using a starch concentration of 4 percent during the extraction operation. Amylose, accounting by iodine affinity for 92 percent of the amylose present (10.8 g. 200 mg. $I_2/g.$), was extracted in the supernatants as shown: from first extract, one-half supernatant yielded 3.90 g. amylose of 98 percent purity (71 percent), from total second extract 1.84 g. amylose of 93 percent purity (16 percent) and from total third extract, 0.70 g. amylose of 80 percent purity (5 percent).

Starch residual yielded amylose-free amylopectin weighing 9.0 g.; amylose precipitable by n-butanol, 0.30 g.

*Example 5*

(Separation of amylose from amylpectin of "high amylose" cornstarch (37° C. water steeped mixture of starches of iodine affinity of 120 mg. $I_2/g.$ and 160 mg. $I_2/g.$, amylose content 52 percent determined by n-butanol complexing; protein 1.07 percent) after prefreezing in water containing 2 percent of sodium silicylate at —78° C. during 4 minutes.)

Twenty (20.0) g. of the treated cornstarch was fractionated by the procedure of Example 1, using a concentration of 4 percent of starch during the extraction operation. Amylose, accounting by iodine affinity for 96 percent of that estimated to be present (10.4 g., 200 mg. $I_2/g.$) was found in the supernatants as shown: one-half of first extract, 3.96 g. amylose of 93.5 percent purity (71 percent); from the total second extract 2.04 g. Amylose of 92 percent purity (18 percent) and from the total third extract, 1.0 g. amylose of 82 percent purity (7.8 percent).

Starch residual yielded amylose-free amylopectin weighing 9.0 g.; amylose precipitate by n-butanol, 0.30 g.

*Example 6*

(Separation of amylose from amylpectin of "high amylose" cornstarch (37° C. water steeped, iodine affinity of 132 mg. $I_2/g.$ amylose content of 52.8 percent determined by n-butanol complexing; protein 1.25 percent) after prefreezing in water at —10° C. during 6 hours.)

Twenty (20.0) g. of pretreated cornstarch was fractionated according to procedure in Example 1, using a 4 percent starch concentration during the extraction operation. Amylose, accounting by iodine affinity for 93 percent of the amylose present (10.5 g. 200 mg. $I_2/g.$) was found in the supernatants as shown: from one-half of the first extract, 4.03 g. amylose of 93.5 percent purity (72 percent); from the total second extract 1.77 g. amylose of 90 percent purity (15.8 percent); from the total third extract 0.85 g. amylose of 81 percent purity (6.8 percent).

Starch residual yielded 9.0 g. of amylopectin unreactive to "Pentasol," with an iodine affinity equal to 78 mg. $I_2/g.$; amylose precipitable by n-butanol, 0.35 g.

Example 7

(Separation of amylose from amylpectin of "high amylose" cornstarch ($SO_2$ steeped, iodine affinity of 136 mg. $I_2$/g., amylose content of 54 percent determined by n-butanol complexing, protein 0.63 percent) after wet milled but undried starch was prefrozen in water containing 25 percent by weight of ethanol at $-78°$ C. during 4 minutes.)

Fractionation of 20.0 g. of starch was carried out as in Example 1. Amylose, accounting by iodine affinity for 94 percent of amylose present (10.8 g. 200 mg. $I_2$/g.) in the starch, was found in the supernatants as shown: from one-half of first extract, 3.95 g. amylose of 99 percent purity (71 percent); from the total second extract, 1.98 g. amylose of 94 percent purity (18 percent); and from the total third extract, 0.68 g. amylose of 80 percent purity.

Starch residual yielded 8.1 g. of amylose-free amylopectin, and 0.20 g. amylose precipitable by n-butanol.

Having fully disclosed our invention, we claim:

1. The method of pretreating sieved high amylose cornstarch (containing at least 46 percent amylose as indicated by an iodine affinity of at least 114 milligrams of $I_2$ per gram of starch), comprising the steps of slurrying one part of said cornstarch in about two parts of water, hard freezing the slurry by placing in a bath at $-10°$ C. to $-78°$ C. for a period of about between 360 minutes and 1 minute to form a solid cake, thawing the cake in about 5 parts of water at $25°$ C., and removing the excess water by filtration.

2. The method of claim 1 wherein the freezing and thawing steps are repeated.

3. The method of claim 1 wherein the bath temperature is $-78°$ C.

4. The method of claim 3 wherein the water used for slurrying the starch additionally contains a member selected from the freezing point-depressant group consisting of sodium salicylate and ethanol.

5. The method of claim 4 wherein the freezing point depressant is 1 percent sodium salicylate based on the water.

6. The method of claim 4 wherein the freezing point depressant is 25 percent ethanol based on the water.

7. The method of obtaining high yields of substantially pure amylose from high amylose cornstarch having an iodine affinity of at least 114 milligrams of $I_2$ per gram of starch comprising hard freezing an aqueous slurry of said high amylose cornstarch to form a solid cake, thawing the cake, reforming an aqueous slurry from the thawed cake, extracting said slurry with boiling water to form an aqueous solution of amylose, and recovering amylose from said aqueous solution.

References Cited in the file of this patent

UNITED STATES PATENTS

| | | |
|---|---|---|
| 1,939,236 | Stokes | Dec. 5, 1930 |
| 2,442,928 | MacMaster | June 8, 1948 |
| 2,515,096 | Schoch | July 11, 1950 |

OTHER REFERENCES

Radley, Starch and its Derivatives, pages 106–107, D. Van Nostrand Co., Inc., New York, N.Y., 1944.

UNITED STATES PATENT OFFICE
CERTIFICATE OF CORRECTION

Patent No. 3,046,161                                          July 24, 1962

Edna M. Montgomery et al.

It is hereby certified that error appears in the above numbered patent requiring correction and that the said Letters Patent should read as corrected below.

Column 4, lines 15, 35, 57 and 73, for "amylpectin", each occurrence, read -- amylopectin --; same column 4, line 18, for "065" read -- 0.63 --; line 32, for "9.0" read -- 3.90 --; same line, for "0.30" read -- 0.36 --; line 50, for "Amylose" read -- amylose --; line 54, for "precipitate" read -- precipitable --; column 5, line 2, for "amylpectin" read -- amylopectin --.

Signed and sealed this 13th day of November 1962.

(SEAL)
Attest:

ERNEST W. SWIDER
Attesting Officer

DAVID L. LADD
Commissioner of Patents